US011034488B2

(12) United States Patent
Liu

(10) Patent No.: US 11,034,488 B2
(45) Date of Patent: Jun. 15, 2021

(54) PARTITION STRUCTURE OF INTERNAL SPACE OF FOOD STORAGE CONTAINER

(71) Applicant: FREE-FREE INDUSTRIAL CORP, Taipei (TW)

(72) Inventor: Sheng-Yu Liu, Taipei (TW)

(73) Assignee: FREE-FREE INDUSTRIAL CORP, Taipei (TW)

( * ) Notice: Subject to any disclaimer, the term of this patent is extended or adjusted under 35 U.S.C. 154(b) by 52 days.

(21) Appl. No.: 16/775,583

(22) Filed: Jan. 29, 2020

(65) Prior Publication Data

US 2020/0165040 A1 May 28, 2020

Related U.S. Application Data

(63) Continuation-in-part of application No. 16/426,371, filed on May 30, 2019, which is a continuation of
(Continued)

(30) Foreign Application Priority Data

Sep. 5, 2016 (TW) .................................. 105128688

(51) Int. Cl.
*B65D 43/16* (2006.01)
*B65D 81/26* (2006.01)
(Continued)

(52) U.S. Cl.
CPC ............ *B65D 43/161* (2013.01); *A47J 47/10* (2013.01); *B65D 25/06* (2013.01); *B65D 43/0218* (2013.01); *B65D 81/261* (2013.01); *B65D 81/262* (2013.01); *B65D 85/34* (2013.01); *B65D 85/36* (2013.01); *B65D 51/1683* (2013.01); *B65D 2543/00101* (2013.01);
(Continued)

(58) Field of Classification Search
CPC ................ B65D 81/261; B65D 81/262; B65D 25/06; B65D 25/04; B65D 85/34; B65D 85/36; B65D 2543/00379; B65D 21/0233; A47J 47/10; A47J 47/08
USPC .................................................. 220/500, 529
See application file for complete search history.

(56) References Cited

U.S. PATENT DOCUMENTS 10,351,311 B2 * 7/2019 Liu .................... B65D 43/0218
2008/0099485 A1 * 5/2008 Holbrook ............... B65D 25/06
220/507
(Continued)

*Primary Examiner* — Don M Anderson
(74) *Attorney, Agent, or Firm* — Chun-Ming Shih; HDLS IPR Services

(57) ABSTRACT

A partition structure of an internal space of a food storage container includes: a container body having a bottom part and lateral parts surrounding a periphery of the bottom part, wherein a transversal inner edge is formed between the lateral parts, and a longitudinal inner edge is formed between the bottom part and each lateral part; and a partition component, disposed in the container body and composed of plural plate units, each plate unit has a partition plate part and an abutting part, and at least one alignment part having a curvature is extended from each abutting part; wherein a curvature defined by the transversal inner edge being extended from each lateral part and a curvature defined by the longitudinal inner edge being extended from the bottom part to each lateral part are substantially the same as the curvature of the alignment part.

8 Claims, 6 Drawing Sheets

Related U.S. Application Data application No. 15/377,978, filed on Dec. 13, 2016, now Pat. No. 10,351,311.

(51) Int. Cl.
*B65D 43/02* (2006.01)
*B65D 25/06* (2006.01)
*B65D 85/34* (2006.01)
*B65D 85/36* (2006.01)
*A47J 47/10* (2006.01)
*B65D 51/16* (2006.01)

(52) U.S. Cl.
CPC .............. *B65D 2543/00296* (2013.01); *B65D 2543/00379* (2013.01); *B65D 2543/00509* (2013.01); *B65D 2543/00537* (2013.01); *B65D 2543/00555* (2013.01); *B65D 2543/00648* (2013.01); *B65D 2543/00694* (2013.01); *B65D 2543/00777* (2013.01); *B65D 2543/00805* (2013.01)

(56) References Cited

U.S. PATENT DOCUMENTS

| | | | |
|---|---|---|---|
| 2009/0078125 A1* | 3/2009 | Pawlick | B65D 25/04 99/448 |
| 2011/0259897 A1* | 10/2011 | Coursey | F25D 3/08 220/592.03 |
| 2015/0099044 A1* | 4/2015 | Bowa | B65D 81/261 426/397 |
| 2019/0276194 A1* | 9/2019 | Liu | B65D 43/0218 |

* cited by examiner

PARTITION STRUCTURE OF INTERNAL SPACE OF FOOD STORAGE CONTAINER

CROSS-REFERENCE TO RELATED APPLICATION

This application is a Continuation-in-Part of co-pending application Ser. No. 16/426,371 filed on May 30, 2019, which is a continuation application of U.S. patent application Ser. No. 15/377,978, filed on Dec. 13, 2016, now U.S. Pat. No. 10,351,311, issued on Jul. 16, 2019, which claims priority to Taiwanese Patent Application No. 105128688, filed on Sep. 5, 2016. The entire disclosure of which is incorporated by reference herein.

BACKGROUND OF THE INVENTION

Field of the Invention

The present invention relates to a food storage container, especially to a partition structure of an internal space of a food storage container.

Description of Related Art

Eating food is a major factor for keeping a human being's life, and the freshness of food should be ensured for preventing from eating deteriorated food and getting ill. With different eating habits of this modern life, sometimes the food has to be temporally stored, and the freshness of food is desired to be ensured when he/she wants to eat, thus a food storage container for storing food and maintaining the freshness thereof is developed.

There are a lot of products for storing food, a container is mostly provided for allowing food to be stored, when different foods are desired to be stored at the same time, the foods can only be mixed in the container because there is no partition provided therein; there are some food storage containers provided with partition plates in the container, but the partition plates and the container are integrally designed, and the partitioned spaces cannot be adjusted or changed according to the foods which are desired to be stored by the user. At present, a detachable partition plate structure is provided for allowing the container to be partitioned according to the user's requirement for conveniently storing different foods.

However, in the conventional structural design, locations, for example a bottom part or a lateral wall, have to be thickened because of limitations caused by assembling and positioning, so that the space utilization is limited or the appearance dimension has to be enlarged.

Accordingly, the applicant of the present invention has devoted himself for improving the mentioned disadvantages.

SUMMARY OF THE INVENTION

The present invention is to provide a partition structure of an internal space of a food storage container, in which with a structural design of being mutually matched, a partition component can be provided in the food storage container for effectively utilizing the internal space, thereby increasing the flexibility and convenience of the food storage container.

Accordingly, the present invention provides a partition structure of an internal space of a food storage container, which includes a container body and a partition component disposed in the container body; the container body has a bottom part and a plurality of lateral parts surrounding a periphery of the bottom part, and a transversal inner edge is formed between the lateral parts, and a longitudinal inner edge is formed between the bottom part and each of the lateral parts; the partition component is composed of a plurality of plate units, each of the plate units has a partition plate part and an abutting part extended from one side of the partition plate part, and at least one alignment part is extended from at least one side of each of the abutting parts; wherein the alignment part is formed with a curvature, and a curvature defined by the transversal inner edge being extended from each of the lateral parts and a curvature defined by the longitudinal inner edge being extended from the bottom part to each of the lateral parts are substantially the same as the curvature of the alignment part.

BRIEF DESCRIPTION OF DRAWINGS

FIG. 1 is a perspective exploded view according to the present invention;

FIG. 2 is a perspective exploded view showing the partition structure according to the present invention;

FIG. 3 is a perspective view showing the assembly of the partition structure being transversally disposed in the container body according to the present invention;

FIG. 4 is a cross sectional view showing the partition structure being transversally disposed in the container body according to the present invention;

FIG. 5 is a perspective view showing the assembly of the partition structure being longitudinally disposed in the container body according to the present invention; and FIG. 6 is a cross sectional view showing the partition structure being longitudinally disposed in the container body according to the present invention.

DETAILED DESCRIPTION OF THE INVENTION

A preferred embodiment of the present invention will be described with reference to the drawings.

Please refer FIG. 1, which is perspective exploded view according to the present invention. The present invention provides a partition structure of an internal space of a food storage container, which includes a container body 1 and a partition component 2 disposed in the container body 1.

The container body 1 is made of a transparent material, for example glass or acrylic. The container body 1 has a bottom part 10 and a plurality of lateral parts 11 surrounding a periphery of the bottom part 11, thereby forming a food storing status in the container body 1. According to one embodiment of the present invention, a cover member 3 can be further provided on top of the container body 1, and a top edge of each lateral part 11 covers on top of the container body 1, thereby allowing the container body 1 to be sealed. Please refer to FIG. 4 The cover member 3 has a top part 30 and a cover edge 31 surrounding a periphery of the top part 30, so that when the cover member 3 covers on top of the container body 1, the cover edge 31 is able to be disposed on a top edge of each lateral part 11, and a sealing ring 310 surrounding an internal periphery of the cover edge 31 is disposed in the cover edge 31, so as to abut against the top edge of each lateral part 11 and seal the container body 1, so that an effect of maintaining freshness can be achieved. Moreover, for allowing the cover member 3 to be tightly combined with the container body 1, a buckling edge 12 can be correspondingly disposed at the lateral part 11 of the container body 1, and a buckling part 32 is correspondingly disposed at the cover edge 31 of the cover member 3, so what when the cover member 3 covers on top of the container body 1, the buckling part 32 can be tightly buckled with the buckling edge 12, thereby enabling the cover member 3 to be tightly combined with the container body 1.

Figure 4:
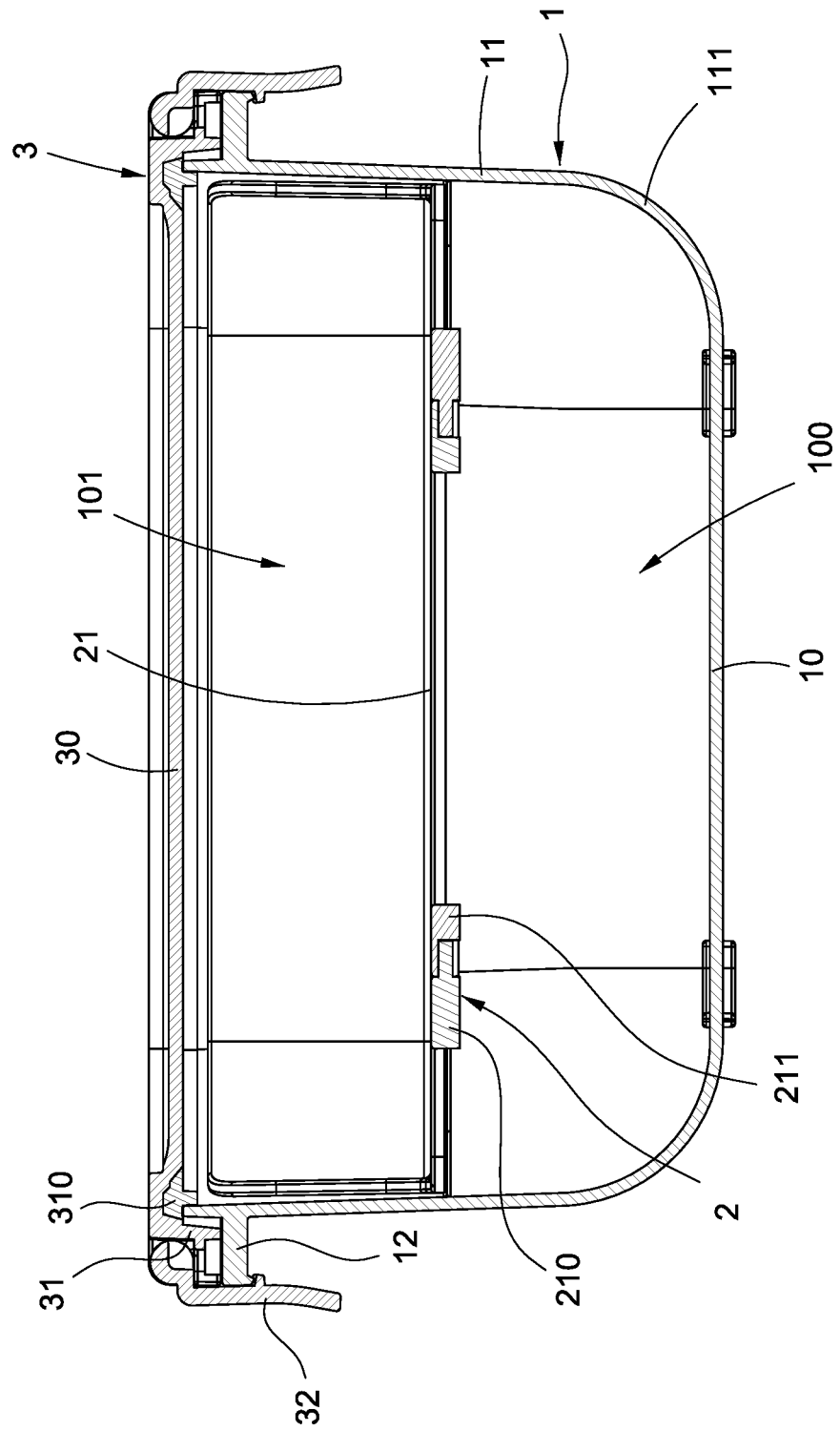
Figure 6:
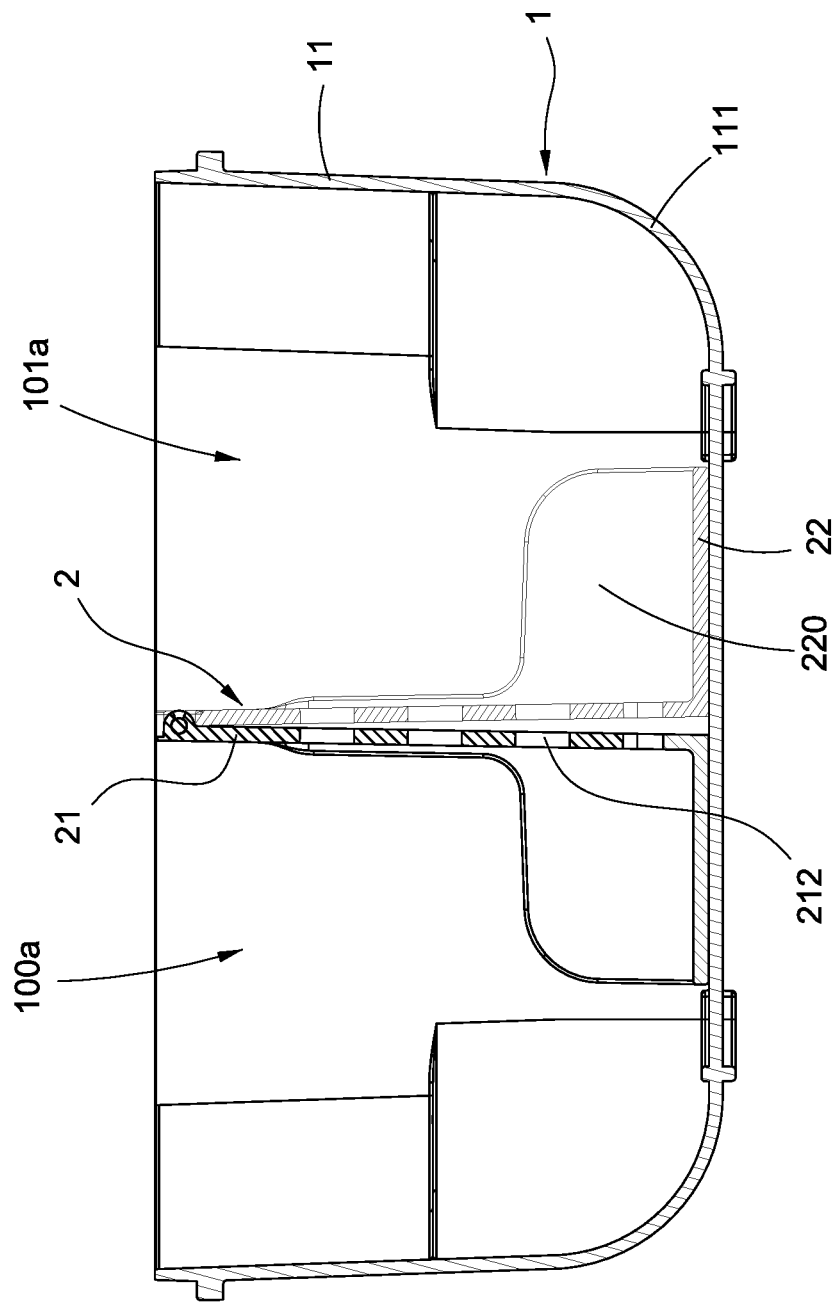

The partition component 2 is disposed in the container body 1 for partitioning the container body 1 so as to allow different foods to be stored therein. The partition component 2 can be formed in a transversal status (as shown in FIG. 4) or in a longitudinal status (as shown in FIG. 6), and be disposed in the container body 1 for partitioning the container body 1 into a first space 100, 100a and a second space 101, 101a. The arrangement of the first space 100, 100a and the second space 101, 101a can be altered according to the status of the partition component 2, so that the partition component 2 formed with the suitable status is able to be disposed in the container body 1 with respect to different foods to be stored by a user.

Figure 2:
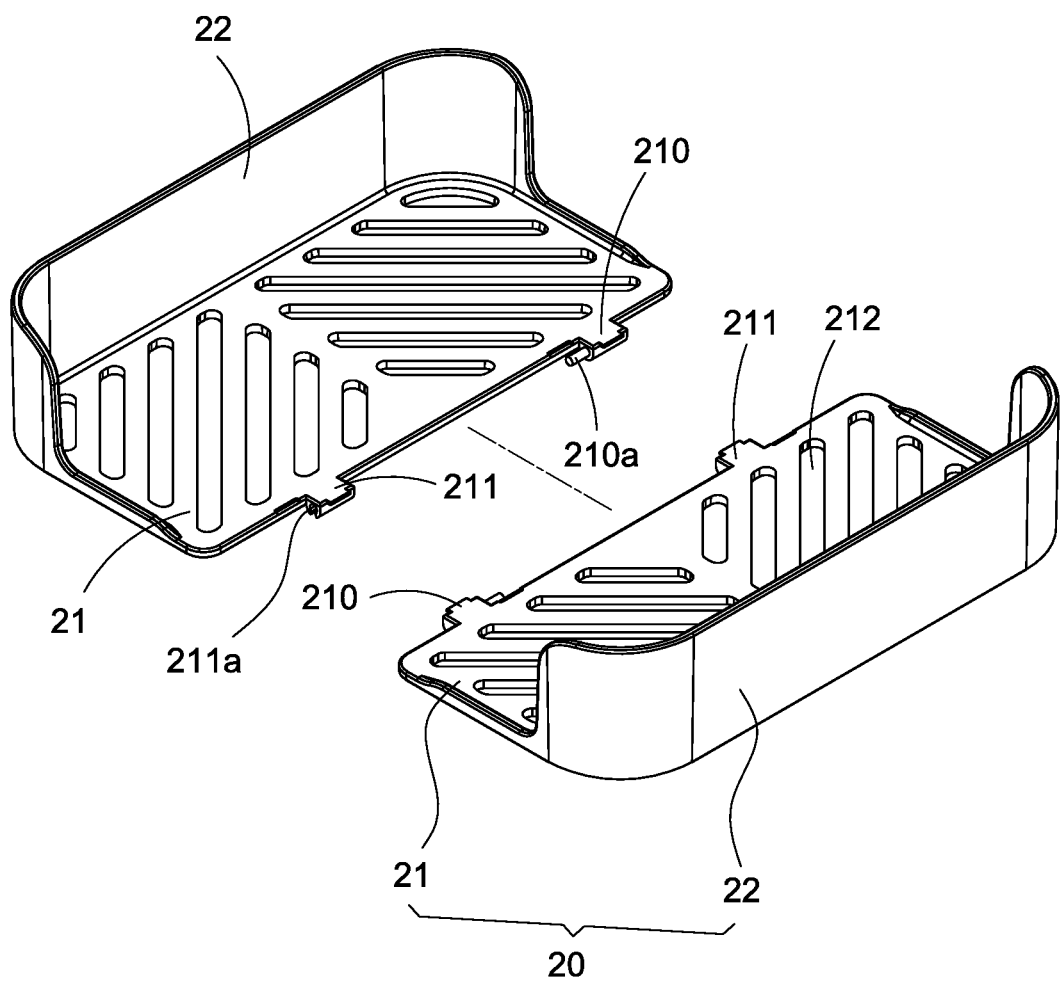

As shown in FIG. 2, the partition component 2 is mainly composed of a plurality of plate units 20, and each plate unit 20 has a partition plate part 21 and an abutting part 22 extended from one side of the partition plate part 21. According to one embodiment of the present invention, there are two plate units 2, the plate units 2 can be made through an injection molding means by utilizing a same mold, and the two plate units 2 are oppositely arranged so as to structure the partition component 2. Details are provided as follows. At least one first pivotal part 210 and at least one second pivotal part 211 are provided at the partition plate part 21 of the plate unit 20 and arranged at one side away from the abutting part 22, wherein the first pivotal part 210 is disposed with a pivotal shaft 210a, and the second pivotal part 211 is disposed with a pivotal hole 211a. As such, when the two plate units 20 are oppositely arranged, the first pivotal part 210 is corresponding to the second pivotal part 211 arranged at the other end, the two plate units 20 can be composed as the partition component 2 through the partition plate parts 21 thereof being pivotally connected, and the partition plate parts 21 can be unfolded to form the transversal status as shown in FIG. 3, or be pivotally folded to form the longitudinal status as shown in FIG. 5.

Figure 1:
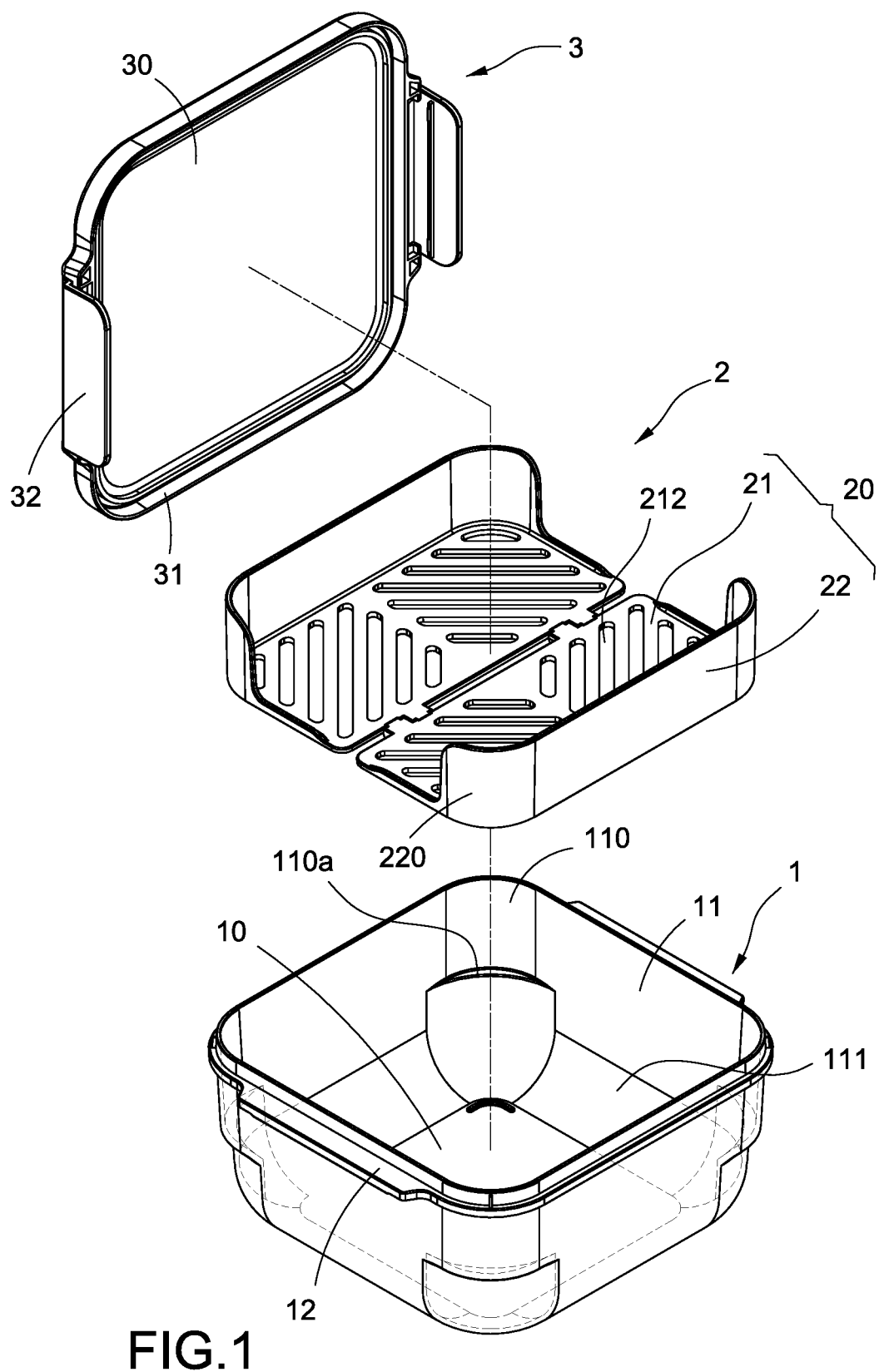
Figure 3:
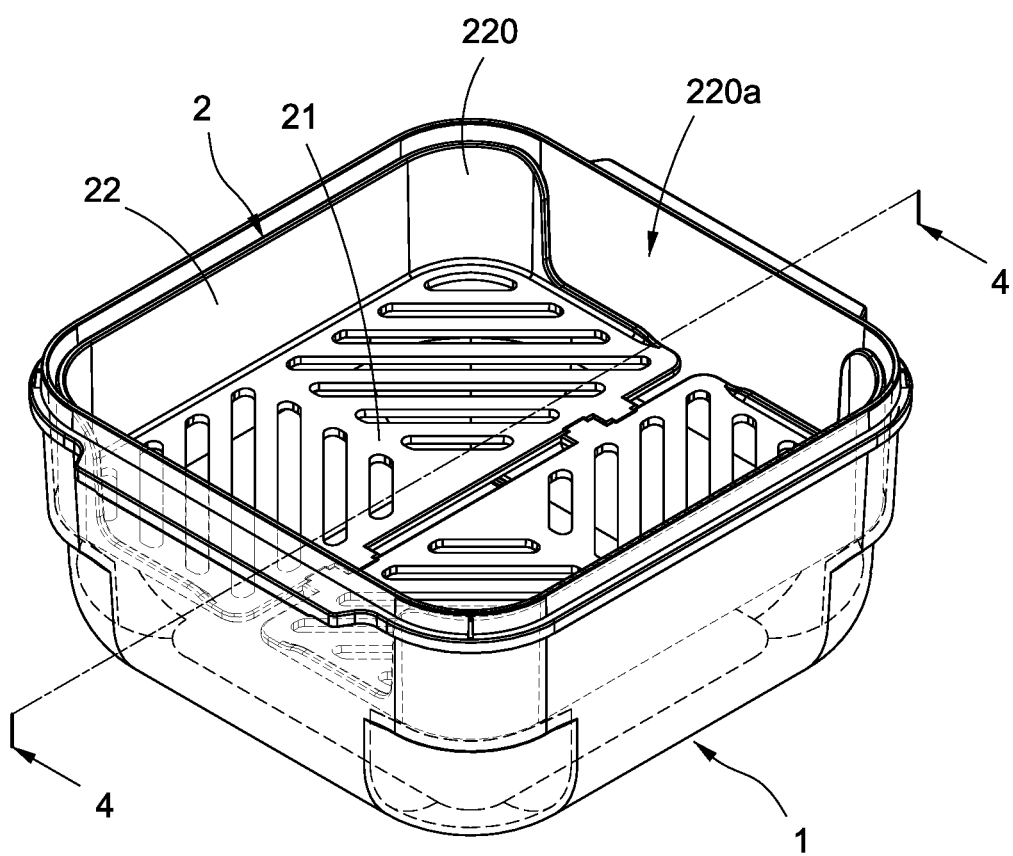
Figure 5:
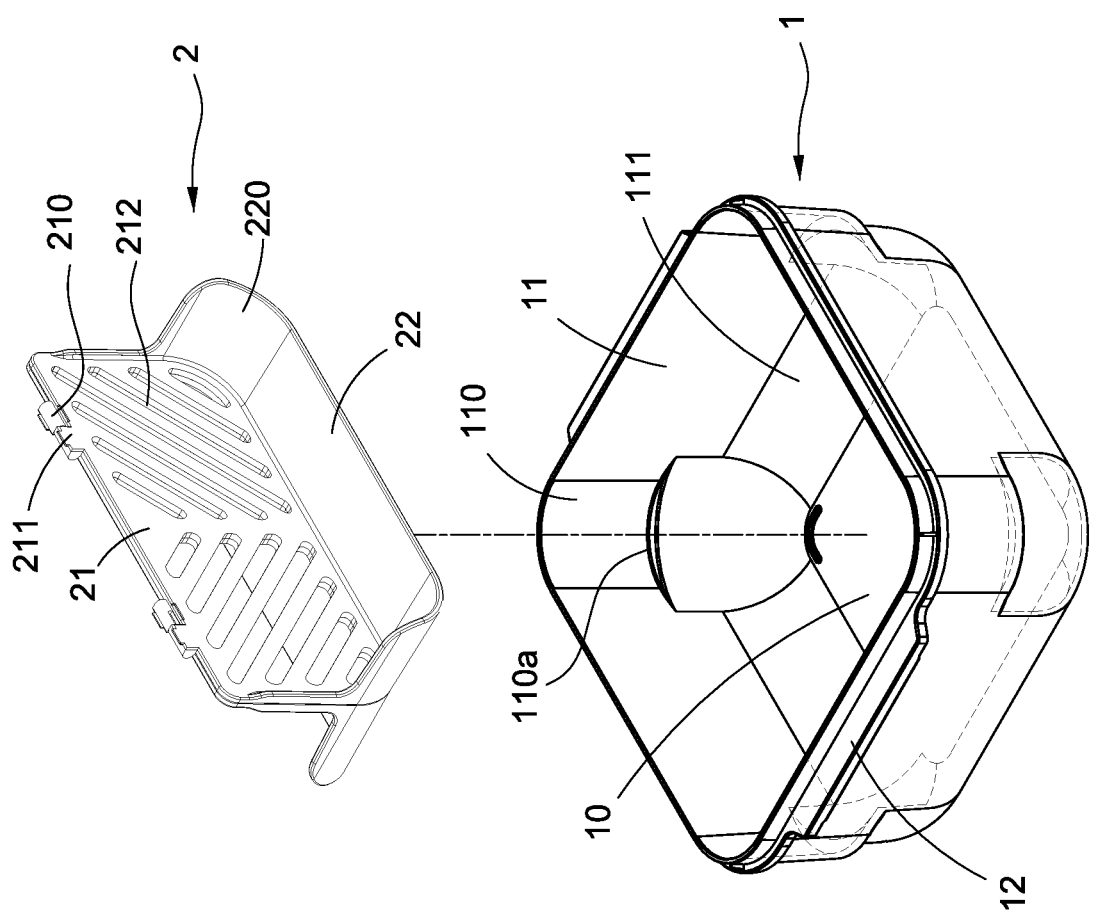

Please refer to FIG. 1, FIG. 3 and FIG. 5. An alignment part 220 is extended from at least one side of the abutting part 22 of each plate unit 20 of the partition component 2, the alignment part 220 is formed with a curvature, a transversal inner edge 110 is formed between the lateral parts of the container body 1, and a longitudinal inner edge 111 is formed between the bottom part 10 and each lateral part 11 of the container body 1; meanwhile a curvature defined by the transversal inner edge 110 being extended from each lateral part 11, and a curvature defined by the longitudinal inner edge 111 being extended from the bottom part 10 to each lateral part 11 are substantially the same as the curvature of the alignment part 220. Accordingly, when the partition component 2 is in the transversal status, the alignment part 220 is able to lean against the transversal inner edge 100 to partition the container body 1 into the first space 100 and the second space 101 which are vertically arranged (as shown in FIG. 4), and a blocking side 110a is formed below the transversal inner edge 110; when the partition component 2 is in the longitudinal status, the container body 1 is partitioned into the first space 100a and the second space 101a which are horizontally arranged (as show in FIG. 6).

What shall be addressed is that: the curvature of the alignment part 220 can also be composed of an arc-shaped surface (as shown in figures), or can be composed of a folded angle (not shown in figures); as long as the curvature of the alignment part 220 is the same as the curvature defined by the transversal inner edge 110 being extended from each lateral part 11 and the curvature defined by the longitudinal inner edge 111 being extended from the bottom part 10 to each lateral part 11, the partition component 2, whether being in the transversal status or the longitudinal status, can be correspondingly matched with the transversal inner edge 110 or the longitudinal inner edge 111 in the container body 1 via the alignment part 220, so that an objective of allowing the partition component 2 to be disposed in the container body 1 can be achieved, and the structure aligning and matching can be simplified; each lateral part 11 of the container body 1 can be thinner, thus a designing objective of maximizing the internal space without enlarging the appearance dimension of the container body 1 can also be achieved.

Furthermore, the curvature can be designed according to an appearance of food desired to be stored. For example, when the partition component 2 is in the transversal status, if a rectangular food, for example a piece of toast or a sandwich, is desired to be stored, the curvature can be designed to match with a curvature defined at an edge of the toast or the sandwich available in a market, so that a freshness maintaining effect for this specified food is provided. For allowing a user to easily take the stored toast or the sandwich, as shown in FIG. 3, an exposed zone 220a is formed between the alignment parts 220 of the two plate units 20, so that the user can easily take via a gap formed in the exposed zone 220a.

Moreover, a plurality of penetrated holes 212 can be formed on the partition plate part 21 of each plate unit 20 of the partition component 2, so that the first space 100, 100a can be in communication with the second space 101, 101a; especially when the partition component 2 is in the transversal status, the second space 101 location in a lower location can still be in communication with the first space 100 located in a higher location.

Based on what has been disclosed above, the partition structure of the internal space of the food storage container is provided.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A partition structure of an internal space of a food storage container, comprising:
    a container body, having a bottom part and a plurality of lateral parts surrounding a periphery of the bottom part, wherein a transversal inner edge is formed between the lateral parts, and a longitudinal inner edge is formed between the bottom part and each of the lateral parts;
    a partition component, disposed in the container body and composed of a plurality of plate units, wherein each of the plate units has a partition plate part and an abutting part extended from one side of the partition plate part, and at least one alignment part is extending from each of the abutting parts;
    wherein at least one of the alignment parts is formed with a curvature, and a curvature defined by the transversal inner edge being extended from each of the lateral parts and a curvature defined by the longitudinal inner edge being extended from the bottom part to each of the lateral parts are the same as the curvature of the at least one of the alignment parts, wherein the partition component is configured to form in a transversal status or in a longitudinal status, the transversal status allows the container body to be partitioned into two spaces which are vertically arranged, and the longitudinal status allows the container body to be partitioned into two spaces which are horizontally arranged, and wherein the at least one alignment part leans against the transversal inner edge when the partition component is configured to be in the transversal status, and the at least one alignment part leans against the longitudinal inner edge when the partition component is in the longitudinal status.

2. The partition structure of the internal space of the food storage container according to claim 1, wherein there are two plate units.

3. The partition structure of the internal space of the food storage container according to claim 2, wherein at least one first pivotal part and at least one second pivotal part spaced with an interval are provided at the partition plate part of each of the plate units and arranged at one side away from the abutting part, so that the at least one first pivotal part on one of the plate units and the at least one second pivotal part on another one of the plate units are pivotally connected.

4. The partition structure of the internal space of the food storage container according to claim 3, wherein the first pivotal part is disposed with a pivotal shaft, and the second pivotal part is disposed with a pivotal hole.

5. The partition structure of the internal space of the food storage container according to claim 2, wherein an exposed zone is formed between the alignment parts of the two plate units of the partition component.

6. The partition structure of the internal space of the food storage container according to claim 1, wherein a plurality of penetrating holes are formed on the partition plate part of each of the plate units of the partition component.

7. The partition structure of the internal space of the food storage container according to claim 1, wherein the curvature of each of the alignment parts is composed of an arc-shaped surface.

8. The partition structure of the internal space of the food storage container according to claim 1, further comprising a cover member, wherein the cover member is configured to work with a top edge of each of the lateral parts for covering on top of the container body.

* * * * *